United States Patent
Schuitman et al.

(10) Patent No.: US 9,987,766 B2
(45) Date of Patent: Jun. 5, 2018

(54) METHOD AND APPARATUS FOR PREPARING CERAMIC BODY SEGMENTS

(71) Applicant: Dow Global Technologies LLC, Midland, MI (US)

(72) Inventors: Abraham D. Schuitman, Midland, MI (US); Nestor A. Vasquez, Shepherd, MI (US); Blake R. Stalder, Midland, MI (US); James R. Ogle, Sanford, MI (US); Paul J. Sacchetti, Warrington, PA (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 234 days.

(21) Appl. No.: 14/362,478

(22) PCT Filed: Dec. 14, 2012

(86) PCT No.: PCT/US2012/069714
§ 371 (c)(1),
(2) Date: Jun. 3, 2014

(87) PCT Pub. No.: WO2013/096113
PCT Pub. Date: Jun. 27, 2013

(65) Prior Publication Data
US 2014/0326229 A1 Nov. 6, 2014

Related U.S. Application Data (60) Provisional application No. 61/577,312, filed on Dec. 19, 2011.

(51) Int. Cl.
*B28B 11/12* (2006.01)
*B23D 45/10* (2006.01)
(Continued)

(52) U.S. Cl.
CPC .............. *B28B 11/12* (2013.01); *B23D 45/10* (2013.01); *B23D 49/003* (2013.01); *B23D 53/005* (2013.01)

(58) Field of Classification Search
CPC ..... C04B 38/0006; B24B 19/22; B28B 11/12; B23D 45/10; B23D 53/00
See application file for complete search history.

(56) References Cited

U.S. PATENT DOCUMENTS

| 3,899,326 A | 8/1975 | Frost et al. |
| 4,001,028 A | 1/1977 | Frost et al. |
| (Continued) | | |

FOREIGN PATENT DOCUMENTS

| JP | 06166017 A | * | 6/1994 |
| JP | 2003220605 A | * | 8/2003 |
| JP | 2007144922 A | | 6/2007 |

OTHER PUBLICATIONS

Translation; Okazaki, JP2007144922A, Nov. 2005.*
(Continued)

*Primary Examiner* — Monica Carter
*Assistant Examiner* — Lauren Beronja
(74) *Attorney, Agent, or Firm* — The Dobrusin Law Firm, P.C.; Daniel P. Aleksynas (57) ABSTRACT

A method including providing a ceramic log (300) with a first end and an opposing second end; providing one or more cutting devices (100) comprised of a dual bladed cutting member (200); and removing material by cutting at least the first end with the dual bladed cutting member (200), wherein a first blade (210) of the dual bladed cutting member (200) provides a finished surface and a second blade (220) removes a percentage of scrap above the finished surface. An apparatus (100) for cutting a ceramic log (300).

20 Claims, 8 Drawing Sheets

(51) Int. Cl.
  B23D 53/00    (2006.01)
  B23D 49/00    (2006.01)

(56) References Cited

U.S. PATENT DOCUMENTS

| | | | |
|---|---|---|---|
| 4,162,285 | A | 7/1979 | Tanabashi |
| 4,329,162 | A | 5/1982 | Pitcher, Jr. |
| 4,471,792 | A | 9/1984 | Koblenzer |
| 4,786,542 | A | 11/1988 | Yasuda et al. |
| 4,837,943 | A | 6/1989 | Mizutani |
| 4,948,766 | A | 8/1990 | Talmy et al. |
| 5,173,349 | A | 12/1992 | Yavuz et al. |
| 5,314,650 | A * | 5/1994 | Adler ............ B28B 3/269 264/142 |
| 5,538,681 | A | 7/1996 | Wu |
| 6,669,751 | B1 | 12/2003 | Ohno et al. |
| 6,953,554 | B2 | 10/2005 | Wallin et al. |
| 7,452,263 | B2 | 11/2008 | Itoh et al. |
| 7,485,594 | B2 | 2/2009 | Saha et al. |
| 7,695,655 | B2 * | 4/2010 | Yamamura ....... B26D 1/547 198/461.1 |
| 2007/0096370 | A1 | 5/2007 | Aoki |
| 2008/0233345 | A1 | 9/2008 | Allen |
| 2009/0249579 | A1 * | 10/2009 | Aramaki ............ B08B 5/02 15/405 |
| 2010/0119769 | A1 * | 5/2010 | Watanabe ....... B01D 39/2093 428/116 |
| 2011/0041827 | A1 * | 2/2011 | Boyko ............ B28B 11/14 125/12 |
| 2012/0001358 | A1 | 1/2012 | Clark et al. |
| 2013/0140742 | A1 * | 6/2013 | Okazaki ........... C04B 35/195 264/413 |

OTHER PUBLICATIONS

King, A.G., Ceramic Technology and Processing, William Andrew Publishing/Noyes, Chapter 7, "Green Machining", Norwich, New York, 2002, pp. 217-229.
King, A.G., Ceramic Technology and Processing, William Andrew Publishing/Noyes, Chapter 9, "Grinding", New York, 2002, pp. 316-332.
Marinescu, I.D, et al., Handbook of Ceramic Grinding and Polishing, "Abrasive Processes", Chapter 3, Noyes Publications, 2000, the University of Michigan, pp. 94-141.
Inasaki, I., et al., Handbook of Ceramic Grinding and Polishing, "Grinding", Chapter 4, Noyes Publications, 2000, the University of Michigan, pp. 190-236.
Reed J., Introduction to the Principles of Ceramic Processing, Wiley Interscience, 1988, Chapters 20 and 21.
Takehide, K., Machine Translation for JP6-166017A, Jun. 14, 1994, NGK Insulators Ltd, Cutter of Ceramic Pipe and Method for Cutting Ceramic Pipe by Using the Same, pp. 1-23.
Masahiro, A., et al., Machine Translation for JP2003220605A, Aug. 5, 2003, Denso Corporation, "Method for Cutting Honeycomb Molding", pp. 1-31.
Shunji, O., Machine Translation for JP2007144922A, dated Jun. 14, 2007, Hitachi Metals Ltd, "Manufacturing Method of Ceramic Honeycomb Structure", pp. 1-29.

\* cited by examiner

METHOD AND APPARATUS FOR PREPARING CERAMIC BODY SEGMENTS

FIELD OF THE INVENTION

The present invention relates generally to a method and apparatus for preparing one or more ceramic bodies (logs) with an improved end shape profile and to filters prepared from the ceramic bodies. More particularly, to a method and apparatus to cut one or more edge surfaces of the ceramic bodies down to a desired segment length and providing an improved end shape profile.

BACKGROUND OF THE INVENTION

Diesel and gasoline engines emit soot particles, very fine particles of carbon and soluble organics as well as typical harmful engine exhaust gases (i.e., HC, CO and NOx). Regulations have been enacted curbing the amount of soot permitted to be emitted. To meet these challenges, soot filters constructed of ceramic bodies have been used. In preferred embodiments, ceramic bodies that include an internal honeycomb structure and at least partially surrounded by a skin layer have been developed.

Manufacturing of these ceramic bodies has typically been accomplished via an extrusion process, wherein ceramic bodies are manufactured as individual logs of various lengths. It is also known that bonded assemblies of one or more individual logs are possible, for example as seen in U.S. Pat. No. 6,669,751, and incorporated herein by reference. The cutting of these logs into desired segment lengths, at a relatively high production rate and with minimizing defects, has been the focus of on-going development efforts in industry. This is particularly true when the logs are in a softer state, commonly known as "green ware". Various cutting and grinding techniques and tools have been developed over the years, for example as disclosed in patent documents US 2007/0096370; U.S. Pat. No. 7,452,263; and US 2008/0233345, as well as numerous text books on the subject, such as Ceramic Technology and Processing, William Andrew Publishing/Noyes, King, A. G. (2002). Handbook of Ceramic Grinding and Polishing, Marinescu, I. D., H. K. Tonshoff, et al. (2000), incorporated herein by reference. Each reference teaches a different tool and/or technique to produce logs at a desired segment length. The method of the present invention is not disclosed. For example, some of the processes disclosed by the references may be limited in the amount of scrap (e.g. length) that can be removed in a single process step, which in turn may increase the time required to produce logs at a given desired segment length. In another example, it is suggested that scoring of the exit corner of the cut be completed prior to cutting the log. Also, it is believed that cutting techniques that utilize a single blade, especially as it exits across the end of the work piece, can contribute to the creation of defects.

Defects in the end surfaces of the logs may be defined broadly as an abnormality in the surface. More explicitly, defects may include cracks or chips (typically greater than about 0.5 mm) in the outer skin layer and/or missing, damaged, or deformed honeycomb walls.

What is needed are processes and tools for preparing extruded ceramic body segments, at commercially acceptable rates, to desired segment lengths without a significant number of defects in the end surfaces (e.g. the outer skin layer and/or the honeycomb structure), that allow for greater flexibility as to the amount of scrap (e.g. length) that can be removed in a single process step.

SUMMARY OF THE INVENTION

The present invention addresses is focused on a new and inventive way to produce ceramic logs at a desired segment length, in a relatively short process cycle time, all while minimizing defects. The present invention disclosed herein may be generally described as a method and/or an apparatus that includes a cutting device with a dual bladed cutting member that simultaneously provides a "finished surface" for the log and removes scrap from above the finished surface.

In one aspect of the present invention, the dual bladed cutting member may be comprised of two coplanar blades that have off-set cutting surfaces (off-set relative to each other parallel to its cutting direction). The off-set may be at least a sufficient distance such that a sufficient amount of scrap is removed to prevent one or more defects proximate to an exit edge of the cut in the ceramic log. It is preferred that the off-set be at least about 2.0 mm, although other off-set values may be desirable depending on other factors, such as type of cutting device, size of the ceramic log, and/or size of the cutting member (e.g. particularly in the case of a circular saw). It is also contemplated that this cutting member be part of a larger cutting apparatus.

In one aspect of the present invention, a defect may be further defined as an imperfection in an outer wall of the log or in any internal structures (e.g. honeycomb walls). Of particular interest are when there are more than one of these defects that may be caused by a cutting process and are generally proximate to (e.g. within about 20 mm) an exit edge of the cutting surface. More particularly, when the defect(s) are about 1 mm or more in depth.

In another aspect of the invention, the dual bladed cutting member may comprise two distinct blade types. It is contemplated that in at least one preferred configuration, the first blade comprises an abrasive blade and the second comprises a blade that removes scrap. The abrasive blade may be a diamond grit blade and the second blade is a serrated blade, preferably a carbide tipped blade.

In another aspect, the ceramic log that is to be cut in this inventive method/apparatus may have a relatively low moisture content (e.g. amount of water or other applicable liquid medium). In at least one preferred configuration, the log's moisture content is no more than about 10 percent (by weight), more preferably less than about 5 percent, and most preferably less than about 2.5 percent.

The invention constitutes a new and inventive way to produce logs at a desired segment length, in a relatively short process cycle time, all while minimizing defects. It should be appreciated that the above referenced aspects and examples are non-limiting, as others exist within the present invention, as shown and described herein.

DETAILED DESCRIPTION

The explanations and illustrations presented herein are intended to acquaint others skilled in the art with the invention, its principles, and its practical application. Those skilled in the art may adapt and apply the invention in its numerous forms, as may be best suited to the requirements of a particular use. The specific embodiments of the present invention as set forth are not intended as being exhaustive or limiting of the invention. The scope of the invention should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are hereby incorporated by reference into this written description.

The invention relates to a method comprising: providing a ceramic log with a first end and an opposing second end; providing one or more cutting devices comprised of a dual bladed cutting member; and removing material by cutting at least the first end with the dual bladed cutting member, wherein a first blade of the dual bladed cutting member provides a finished surface and a second blade removes a percentage of scrap above the finished surface.

In another aspect the invention relates to a ceramic log cutting apparatus, comprising: a nesting fixture for holding the ceramic log; one or more cutting devices, the cutting device comprised of a motor and a dual bladed cutting member; wherein a first blade of the dual bladed cutting member provides a finished surface and an off-set second blade removes a percentage of scrap above the finished surface.

The invention may be further characterized by one or any combination of the features described herein, such as: the percentage of scrap removed by the second blade is sufficient to prevent one or more defects proximate to an exit edge of the cut in the ceramic log; the one or more defects proximate to the exit edge of the cut comprises an area of ceramic material that is missing from the finished surface; the one or more defects proximate to the exit edge of the cut comprise at least one chip with a depth of at least 1 mm; the second blade provides increased structural rigidity to the first blade; a leading edge of a cutting surface of the second blade is off-set inside that of a leading edge of a cutting surface of the first blade a sufficient distance such that a sufficient amount of scrap is removed to prevent one or more defects proximate to an exit edge of the cut in the ceramic log; the second blade is off-set at least 2 mm inside that of the leading edge of the cutting surface of the first blade; the first blade comprises a first blade type and the off-set second blade comprises a second blade type; the first blade type and the second blade type are identical; the first blade type is an abrasive saw; the second blade type is a serrated blade with a single sided set; the serrated blade has a kerf that ranges between 4 mm to 30 mm; the ceramic log has a moisture content below 10 percent; the ceramic log has a moisture content below 5 percent; the ceramic log has a moisture content below 2.5 percent; comprising the steps of removing material by cutting at least the opposing second end with the dual bladed cutting member; the first end and the opposing second end are cut concurrently with two dual bladed cutting members; the cutting device comprises a circular saw; the cutting device comprises a band saw; the cutting device comprises a reciprocating saw; the ceramic log comprises a one or more honeycomb structures encased by any outer skin layer, the one or more defects proximate to the exit edge of the cut comprise an area of honeycomb wall detachment from the outer skin layer and/or other honeycomb structures; the ceramic log comprises green ware; and the ceramic log comprises mullite, cordierite, SiC or mixtures therein.

The present invention relates to an improved method and apparatus for the preparation of ceramic products (logs) at a desired segment length, in a relatively short process cycle time, all while minimizing defects, defects particularly at or proximate to the exit edge of the cut.

Ceramic Products

Ceramic products (and ultimately ceramic bodies or logs) are generally prepared by multi-step process. Generally, the process begins by contacting one or more precursors for the ceramic structure, ceramic precursors, optionally one or more binders and one or more liquid carriers. The next step generally includes the formation of the desired shape, which can be completed by numerous shaping processes, but most commonly by extrusion, then cut to a near net dimension (e.g. length, width, thickness) before the next processing step. The product typically is then dried to a point where the moisture content ranges from about 0 to 10 percent. It is at this point where the inventive method/apparatus may be used (although it is contemplated that the inventive method/apparatus can be used on ceramic products that have been further processed). After the product is cut to a "finished" length, then it may be further processed (e.g. plugged, calcined, mullitized, etc.). Additional details on these steps are disclosed in the following paragraphs.

The ceramic precursors are generally the reactants or components which when exposed to certain conditions form a ceramic body or part, which may include materials such as disclosed in U.S. Pat. No. 7,485,594; U.S. Pat. No. 6,953,554; U.S. Pat. No. 4,948,766 and U.S. Pat. No. 5,173,349 all incorporated herein by reference, for example a porous mullite composition made by forming a mixture of one or more precursor compounds having the elements present in mullite (e.g., clay, alumina, silica) and a property enhancing compound. The property enhancing compound may be a compound having an element selected from the group consisting of Mg, Ca, Fe, Na, K, Ce, Pr, Nd, Sm, Eu, Gd, Tb, Dy, Ho, Er, Tm, Yb, Lu, B, Y, Sc, La and combination thereof. Also a ceramic precursor comprising silicon carbide, cordierite, aluminum titanate, alumina, zirconia, silicon nitride, aluminum nitride, silicon oxynitride, silicon carbonitride, beta spodumene, strontium aluminum silicates, lithium aluminum silicates, and the like. Organic binders useful in this invention include any known materials which render the wet ceramic green ware shapeable. Preferably, the binders are organic materials that decompose or burn at temperatures below the temperature wherein the ceramic precursors react to form ceramic bodies or parts. Among preferred binders are those described in *Introduction to the Principles of Ceramic Processing*, J. Reed, Wiley Interscience. 1988) incorporated herein by reference. A particularly preferred binder is methyl cellulose (such as METHOCEL A15LV methyl cellulose, The Dow Chemical Co., Midland, Mich.). Liquid carriers include any liquid that facilitates formation of a shapeable wet ceramic mixture. Among preferred liquid carriers (dispersants) are those materials described in *Introduction to the Principles of Ceramic Processing*, J. Reed, Wiley Interscience, 1988). A particularly preferred liquid carrier is water. The mixture useful in preparing wet ceramic green ware bodies may be made by any suitable method such as those known in the art. Examples include ball milling, ribbon blending, vertical screw mixing, V-blending and attrition milling. The mixture may be prepared dry (i.e., in the absence of a liquid carrier) or wet. Where the mixture is prepared in the absence of a liquid carrier, a liquid carrier is added subsequently utilizing any of the methods described in this paragraph.

The mixture of ceramic precursors, optionally binders, and liquid carriers may be shaped by any means known in the art. Examples include injection molding, extrusion, isostatic pressing, slip casting, roll compaction and tape casting. Each of these is described in more detail in *Introduction to the Principles of Ceramic Processing*, J. Reed, Chapters 20 and 21, Wiley Interscience, 1988, incorporated herein by reference. In a preferred embodiment the mixture is shaped into the near net shape and size of the ultimate desired ceramic body, such as a flow through filter. Near net shape and size means the size of the wet ceramic green ware body may be within about 10 to 15 percent by volume of the size of the final ceramic body, and preferably the size and shape may be within 5 percent by volume of the size of the final ceramic body. In one preferred embodiment the ceramic structures comprise a honeycomb structure and an outer skin layer. Preferably the honeycomb structure is disposed in planes perpendicular to the extrusion direction. The outer skin layer and the walls of the honeycomb structure generally have a thickness of between about 250 and 600 microns, although structures with thicknesses of up to about 50 percent larger or smaller are contemplated. In use, each channel formed is plugged at one end or the other. On a face the channels are plugged in an alternating fashion. Preferably the wet ceramic green ware body does not have any of the channels or flow passages blocked or plugged. In practicing the invention, the porous ceramic honeycomb as well as the plugs (note, the plugs may be the same or a different ceramic than the honeycomb as well as may simply be the partition walls of the honeycomb pinched together to close off a channel) may be any suitable ceramic or combinations of ceramics.

In a preferred embodiment, the wet ceramic green ware body is shaped such that it can be utilized as a flow through filter. At this stage in the process the wet ceramic green ware body has two opposing faces which are substantially planar. The wet ceramic green ware body exhibits a cross sectional shape which is consistent for all planes parallel to the two opposing faces. The cross-sectional shape can be any shape which is suitable for the intended use and may be irregular or may be of any known shape, such as round oval or polygonal. Preferably the cross sectional shape exhibits a flat surface capable of supporting the ceramic body. Preferably the cross-sectional shape is polygonal. In one preferred embodiment, the shape is rectangular or square. If the shape is irregular, it must have at least one linear path or one surface that is planar such that the wet ceramic body can be disposed on the carrier on the linear path or planar surface. The wet ceramic green ware body has a plurality of walls formed which extend from one opposing face to the other opposing face. The walls form a plurality of flow passages that extend from one opposing face to the other opposing face. Preferably, at this stage, all of the flow passages are open to both opposing faces. This allows more efficient removal of liquid carrier. Thereafter the wet ceramic green ware body is subjected to conditions to remove the liquid carrier, that is to dry the wet ceramic green ware body, preferably to a point where the moisture content is about 10 percent or less, more preferably about 5 percent or less and most preferably about 2.5 percent or less. Preferred drying methods are described in co-owned co-pending application titled "DRYING METHOD FOR CERAMIC GREENWARE" filed Jun. 22, 2011 Ser. No. 13/166,298 and filed in the PCT Jun. 22, 2011 application number PCT/US/11/41410 both incorporated herein by reference.

After removal of the liquid carrier from the wet ceramic green ware body, the ceramic green ware body can be prepared for conversion to a ceramic body, and wherein the present inventive process/apparatus is most likely utilized, by cutting the body (log) to a desired length (although present invention may be equally effective when the ceramic is further cured or mullitized). After utilizing the inventive method/apparatus disclosed herein, the ceramic green ware body is exposed to conditions to burn out the binder and to form the ceramic structure. Processes to achieve this are well known in the art. The dry ceramic green ware parts are calcined by heating the dry ceramic green ware parts to temperatures at which organic additives and binders are volatilized or burned away. The parts are further heated to temperatures at which the ceramic particles fuse or sinter together or create new particulates that subsequently fuse together. Such methods are described by numerous patents and open literature including, for example, U.S. Pat. Nos. 4,329,162; 4,471,792; 4,001,028; 4,162,285; 3,899,326; 4,786,542; 4,837,943 and 5,538,681; all incorporated herein by reference.

It is contemplated that the present invention may be applicable to any porous particulate bodies. Most preferably to greenware, debindered greenware, and even calcined where particulates are fused but later fused or reacted to form a stronger body.

Defects

It is contemplated that a "defect" as it relates to the present invention may be broadly defined as a surface irregularity on or near the end surface of the cut log. This surface irregularity may be in the walls of honeycomb structure, in the outer skin layer, or both. Illustrative examples are shown in FIGS. 2A-F, where "chips" of the outer skin layer are missing and/or where parts of the honeycomb wall are absent. In one embodiment, a defect may be defined as a surface irregularity that causes problems with the downstream processing of the part, for example preventing the honeycomb channel from being plugged. In a preferred embodiment, the defect may be defined as at least one chip with a depth of at least 1 mm (depth from the finished surface) at or near (e.g. with about 25 mm) the exit edge of the cut.

Cutting Device

A cutting device and method is provided that is capable of cutting ceramic bodies, and more preferably wet (e.g. containing less than about 10% liquid by weight) ceramic green ware bodies, to a desired dimension (e.g. length), while maintaining or creating an acceptable surface finish on the part. It is also contemplated that the cutting process should be relatively quick, for example it should be able to cut the ceramic body to a desired length in less than about 2 minutes, and preferably less than about 20 seconds, and preferably greater than about 5 seconds (too fast may damage the body). It is also preferred that it should only take one cutting pass (per end) to achieve the desired length and surface finish. In one preferred embodiment, the scrap material removed from the end being cut is sufficient to prevent one or more defects proximate to an exit edge of the cut in the ceramic log.

It is contemplated that the travel across the body being cut at a preferred range of speeds from about 10 to 40 cm/minute. In the case of a circular saw configuration, the rotation of the blade may vary from as low as about 500 rpm to as high as about 3000 rpm or higher. In a preferred embodiment, the rotation is about 750 to 2500 rpm, and more preferably about 1000 to 2000 rpm. In the case of a band or reciprocating saw, the linear movement of the blade is in terms of meters per minute (m/min). It is contemplated that this could range from as low as about 900 m/min to as high as about 2000 m/min. Preferably, the linear movement of the blade is about 1500 m/min to about 1750 m/min, and more preferably from about 1600 m/min to 1700 m/min.

The cutting device may be included in a ceramic log cutting apparatus. The apparatus may include a nesting fixture that functions to hold the ceramic part. It may also include a power source (e.g. motor) that functions to move the cutting device(s). It may also include one or more cutting devices, for example cutting devices disposed a distance apart from each other such that each device can cut opposing edges of the ceramic part either simultaneously or in close temporal proximity.

The cutting device may be configured in many different forms. Functionally, the device both removes an amount of the log (e.g. scrap) and provides a relatively defect free end surface (e.g. one or less chips). The device may be in the form of a circular saw, a band saw, or a reciprocating saw. No matter the form of the cutting device, the device should be configured to have two or more cutting surfaces that are immediately adjacent (e.g. with about 10 mm) to one another or are in contact.

The cutting device preferably consists of a dual bladed cutting member, where one blade functions to directly cut the finished surface of the log and a second blade that functions to aid in the removal of the scrap material. These two blades may abut one another along one plane (or may be spaced apart as much as about 10 mm) and are preferably off-set along the cutting surface. It is preferred that a leading edge of a cutting surface of the second blade may be off-set inside that of a leading edge of a cutting surface of the first blade a sufficient distance such that a sufficient amount of scrap is removed to prevent one or more defects proximate to an exit edge of the cut in the ceramic log. In one preferred embodiment, the second blade is off-set about 2.0 mm or more, more preferably about 5.0 mm or more, most preferably about 12.5 mm or more, and off-set about 50.0 mm of less, more preferably about 45 mm or less, most preferably about 40.0 mm or less, all inside the leading edge of the cutting surface of the first blade.

The blades may comprise the same or different blade types, so long as they provide the functionality discussed within this disclosure. In one embodiment, the blades consist of the same type of blade. In another embodiment, the blades are two different types. The type of blades useful include for example, abrasive saw blades and serrated saw blades. An abrasive saw blade is similar to a thin grinding wheel, and a serrated saw blade is a blade with a cutting edge that has many small points of contact with the material being cut.

In a preferred embodiment, the blades are different types, wherein the first blade is an abrasive blade and the second blade is a serrated blade. More particularly, the abrasive blade comprises a diamond grit blade and the serrated blade is a carbide tipped blade, and more particularly a blade with a single sided set.

In one preferred diamond grit blade embodiment, the blade may comprise a grit rating that may range from as low as 40/60 to as high as 200/220 and still may perform as required. Functionally, the grit value should be appropriate to cut the log without creating excessive defects. It is believed that the higher the grit value (e.g. the finer the abrasive), the better the chance to have a defect free cut, but the higher the chance that the blade will become clogged sooner and would have to be cleaned ("dressed") more often than would be desired, particularly in a production environment. It is believed that there is a relationship between the moisture content of the log and the limit on how high a grit value that can be used. In one preferred embodiment, a grit value of about 60/80 or less may be used on logs with a moisture content below about 10 percent by weight or less, more preferably a grit value of about 100/120 or less on logs with a moisture content below about 5 percent by weight or less, and most preferably a grit value of about 200/220 or less on logs with a moisture content below about 2.5 percent by weight or less.

In one preferred serrated blade embodiment, the cutting member has a kerf that is about 2 mm or more, more preferably about 4 mm or more and most preferably about 7 mm or more. It is also preferred that the kerf is about 50 mm or less, more preferably about 40 mm or less, and most preferably about 30 mm or less.

Preferably the blades provide complementary structural reinforcement or increased structural rigidity, particularly in the case where the two blades abut one another along one plane. The blades in combination provide sufficient stiffness to reduce or eliminate any deflection that may induce defects. In a preferred embodiment, the two blades together are at least 100% more stiff than if the blades were not together. This may function to allow the blades to be run while preventing excessive movement or flexing that could cause surface defects on the ceramic part.

In one preferred embodiment, the device is a circular saw, where the device includes dual blades that rotate in the same direction about a central axis. It is preferred that the dual blades abut one another in one plane and have cutting surfaces that are radially off-set (a first larger and a second smaller blade). It is contemplated that the diameter of the blades should be larger than the cross length of the ceramic body to be cut. In one preferred embodiment the blades diameter is sufficiently large such that it cuts the log in one pass. Preferably, the blade diameter is at least about 240 percent or more larger than the cross length of the ceramic body (e.g. area to be cut), more preferably about 300 or more, and most preferably about 385 or more; and at most about 600 percent larger, more preferably at most about 500 larger, and most preferably at most about 420 larger.

Figure 3A:
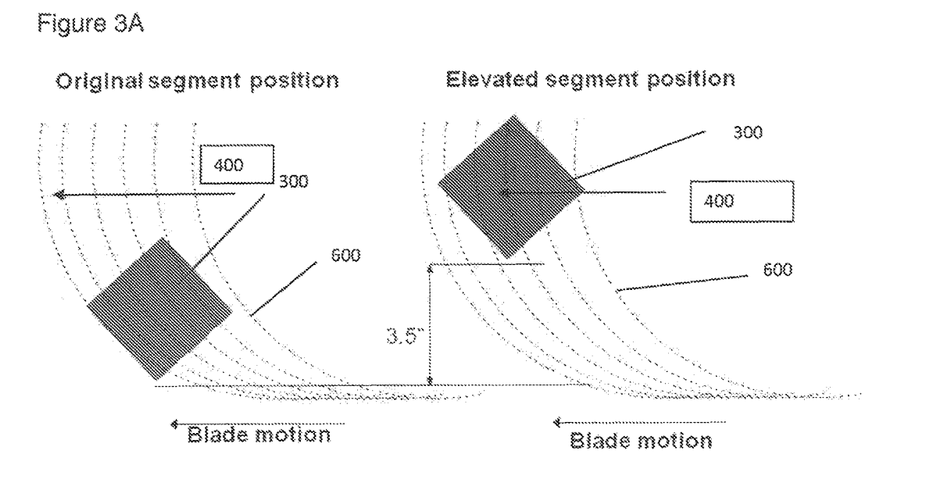
FIG. 3A illustrates differences in orientation of a cutting blade to a ceramic log between passing through a ceramic log to be cut the centerline of a blade, cutting direction, and a portion of the blade below the centerline.

It is also preferable that all of the cross length of the ceramic body be positioned well inside the blade diameter. In other words, the center of the ceramic body should be proximate to the axis of rotation of the circular blade. Preferably, the center axis of the ceramic body be the same as that of the axis of rotation of the circular blade or laterally off-set at most about ½ the radius of the larger first blade, more preferably no more than about ⅓, and most preferably no more than about %. An illustrative example (Example No. 3) is provided below. FIG. 3A shows the axis of rotation 400 (center of blade in the cutting direction) with respect to two orientations of the ceramic body with respect to the blade.

Preferably a method of cutting, given the above details and the examples below, includes at least the steps of: providing a ceramic log with a first end and an opposing second end; providing one or more cutting devices comprised of a dual bladed cutting member; and removing material by cutting at least the first end with the dual bladed cutting member, wherein a first blade of the dual bladed cutting member provides a finished surface and a second blade removes a percentage of scrap above the finished surface.

Preferably, the percentage of the scrap removed by the second blade is sufficient to prevent the defects discussed in this application. As the blades move across the log, making the cut, the second blade removes a percentage the scrap from above the first blade. This should help reduce the occurrences of defects by removing the mass of the scrap and the potential deleterious effects the presence of the scrap may have on the log walls (internal or external walls) before the first blade nears (or reaches) the exit edge of the cut. In a preferred embodiment, the second blade removes at least about 50 percent of the scrap, more preferably at least about 60 percent, most preferably at least about 70 percent of the total scrap, and at most about 95 percent, more preferably at most about 90 percent, and most preferably at most 85 of the total scrap before the first blade nears (or reaches) the exit edge of the cut.

There is a relationship between the kerf of the serrated blade and the position of the cut being made below the end of the log. The distance "D", is the distance from the end of the uncut log to the finished cut surface. It is preferred that "D" be small enough so the cutting member can effectively remove the scrap and prevent defects in the log from the cutting, but large enough allow for the process to require only one cut per side. Preferably, "D" is about 0.5 times to about 3.0 times the kerf of the second blade, more preferably about 0.75 times to 2.0 times and most preferably about 1.0 to 1.5 times the kerf.

Illustrative Embodiments of the Invention

The following examples are provided to illustrate the invention, but are not intended to limit the scope thereof. Any dimensional information used in these examples should not be considered limiting and it is contemplated that the ceramic parts and cutting devices could be significantly smaller or larger.

Example 1: Circular Saw 200

Figure 1:
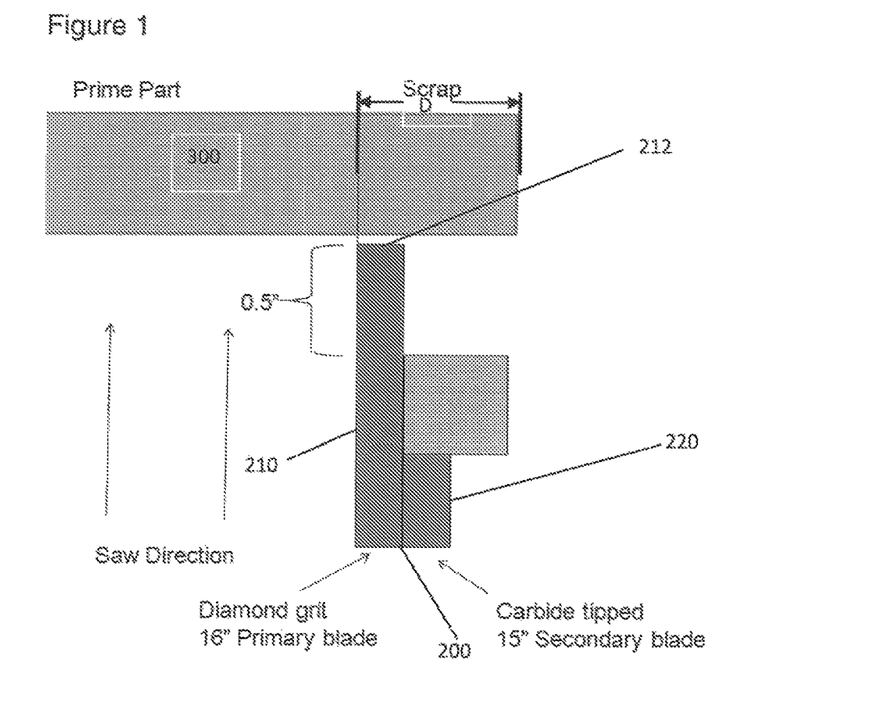
FIG. 1 illustrates the relationship of a blades of the cutting apparatus with respect to a ceramic log to be cut.
Figure 2:
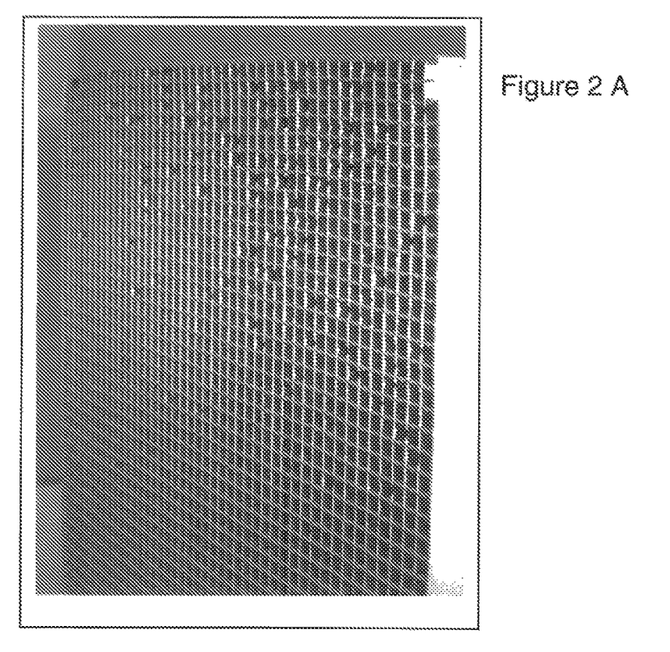
FIGS. 2A to 2F illustrate defects that can result from ceramic log cutting processes.
Figures 2B, 2C, 2D:
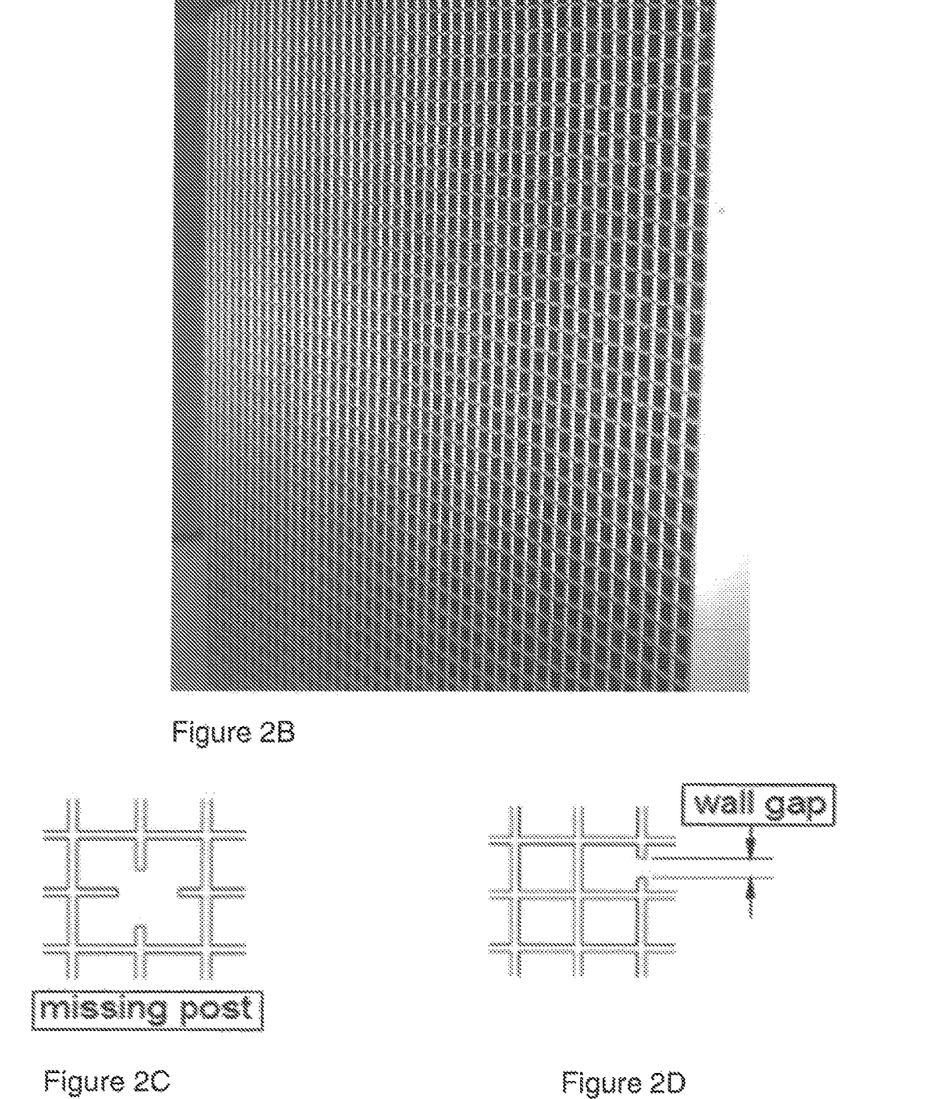
Figure 2E:
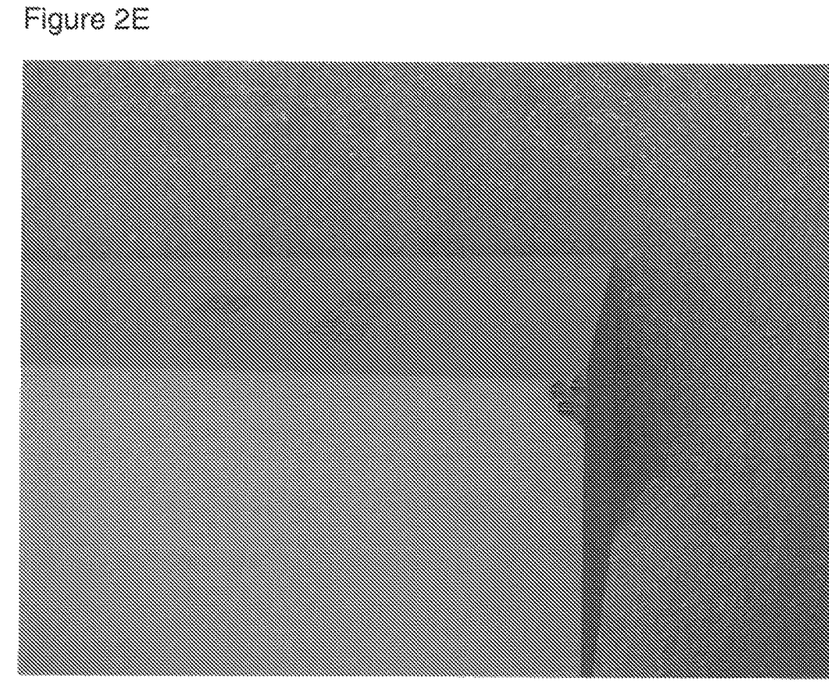
Figure 2F:
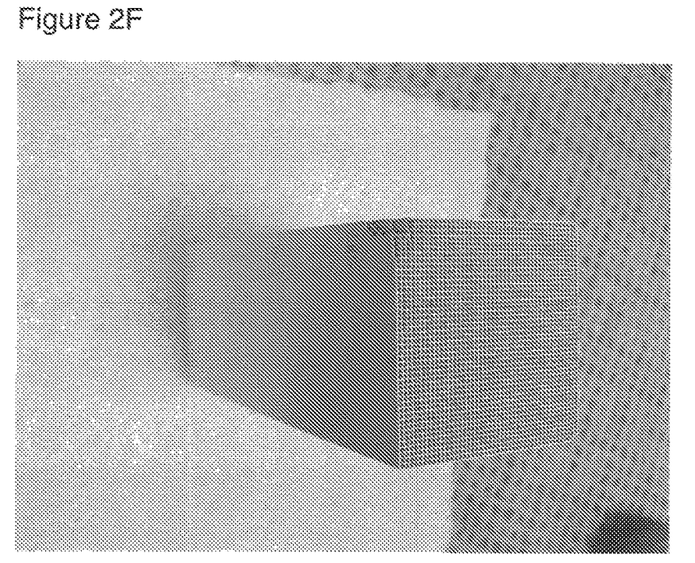
Figure 4A:
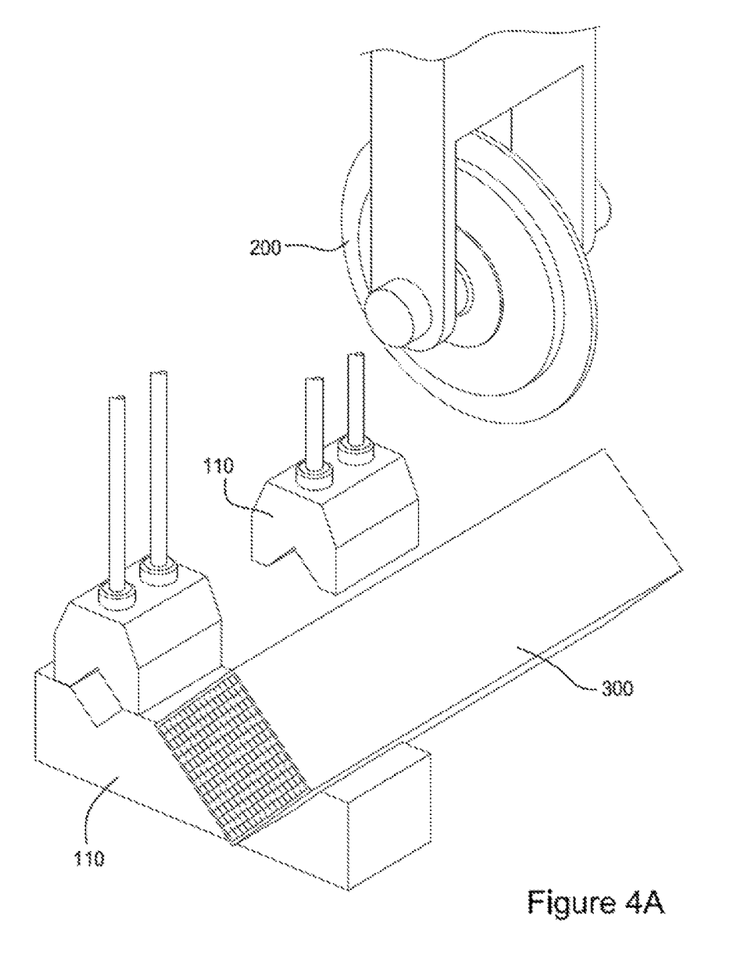
FIG. 4A shows a cutting apparatus of the invention with a ceramic log disposed thereupon.
Figure 4B:
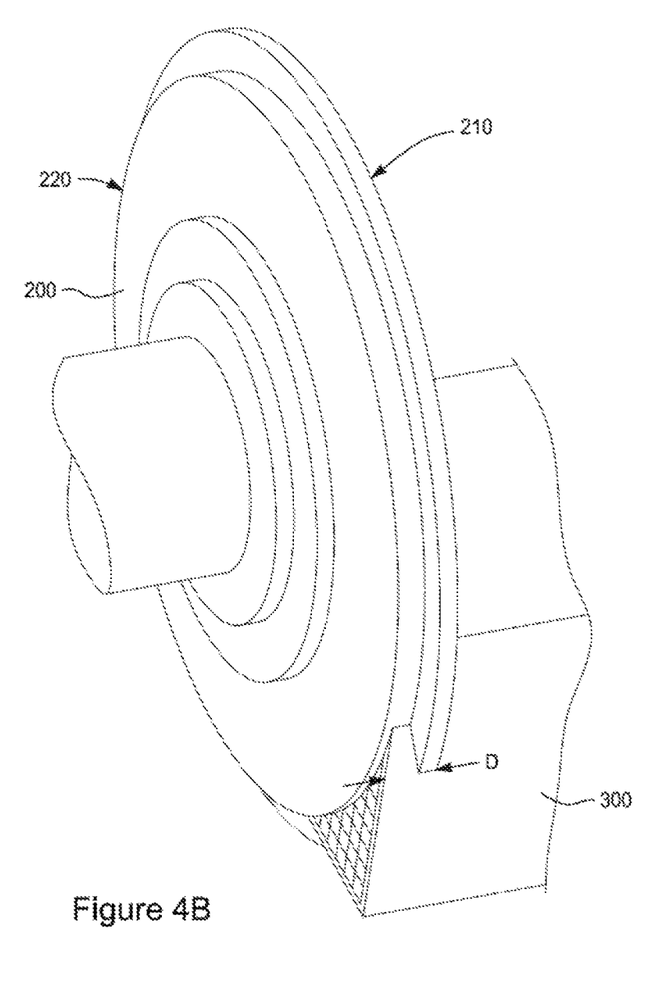
FIG. 4B shows a cutting blade of the apparatus passing through a ceramic log.

As an illustrative example, as shown in FIGS. 1, 4A and 4B, a circular saw style ceramic log cutting apparatus 100 is presented. The apparatus 100 includes a dual bladed cutting member 200, a ceramic log 300, a nesting fixture 110, and motors (not shown) that drive the member 200.

The dual bladed cutting member 200 in this example consists of a first blade 210 and a second blade 220 abutting one another, as illustrated in FIG. 1. In this example, the first blade 210 is a circular blade with a diameter of about 16 in (406 mm) and the second blade with a diameter of about 15.0 in. (381 mm). Both blades rotate about a common axis 9 in the same direction) and a leading edge 222 of the cutting surface of the second blade 220 is off-set inside that of a leading edge 212 of the cutting surface of the first blade 210 by about 0.5 in. (12.5 mm). Blade 210 is an abrasive saw, in this example a diamond grit blade (0.050 in. (1.3 mm)) core thickness and an 80/100 diamond grit) and blade 220 is a serrated blade with a single sided set, more specifically a carbide tipped blade (0.125 in. kerf (3.2 mm)).

The member 200 is rotated at a rate of about 1500 rpm and feed into the log 300 at a rate ranging from about 10 to 40 cm/minute to perform the cutting of the log 300. The cut is made below the end of the log a distance "D" that is equal to or as much as 1.5 times the kerf of blade 220.

Example 2: Band Saw/Reciprocating Saw 500

As another illustrative example, a band saw/reciprocating saw style ceramic log cutting apparatus 100 is presented. The cutting member 500 is similar to that presented in the circular saw example above in that a leading edge 522 of the cutting surface of the second blade 520 is off-set inside that of a leading edge 512 of the cutting surface of the first blade 510 by about 0.5 in. (12.5 mm). Blade 510 is an abrasive saw, in this example a diamond grit blade (0.050 in. (1.3 mm)) core thickness and an 80/100 diamond grit) and blade 520 is a serrated blade with a single sided set, more specifically a carbide tipped blade (0.125 in. kerf (3.2 mm)). The member does not rotate, but has a linear motion (one direction for the band saw and two for the reciprocating saw) of about 1700 m/minute and feed into the log 300 at a rate ranging from about 10 to 40 cm/minute to perform the cutting of the log 300.

Example 3: Circular Saw 600

Figure 3B:
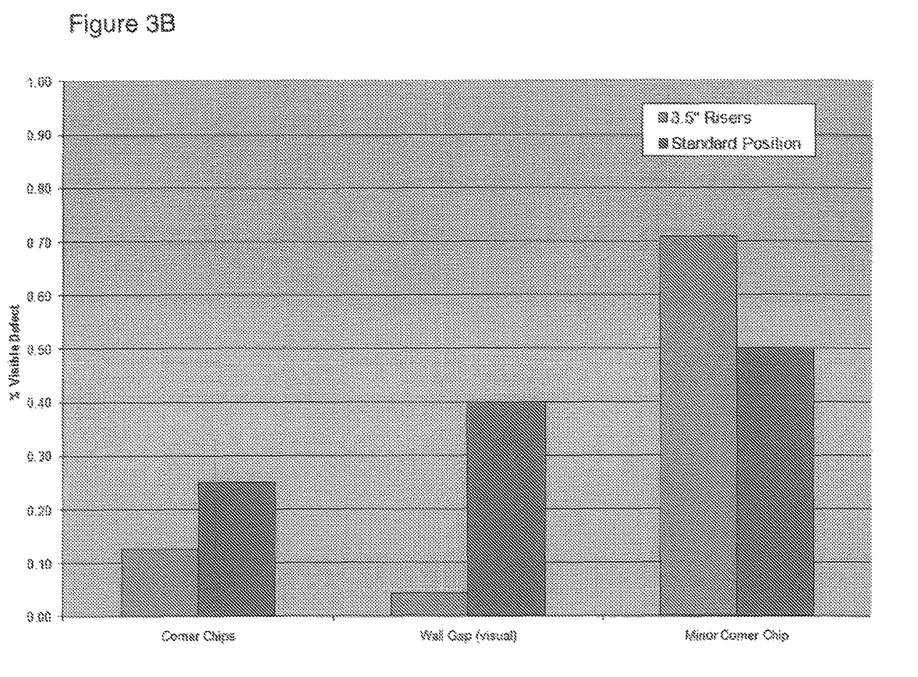
FIG. 3B is a bar chart of the results of Example 3.

In an illustrative example, two circular saw style ceramic log cutting methods are presented. In a first set-up (YL11), a log 300 is placed such that the bottom of the log 300 is disposed nearer the bottom of the circular saw 600. In a second set-up (YL14), the log 300 is placed such that it is nearer the axis of rotation of the saw 600, both set-ups as shown in FIG. 3A. Two groups of seven logs 300 each are processed as described in example 1 above, with the location of the log 300 relative to the axis of rotation of the saw 600 being different for each group. Table 1 shows the result and illustrates that the average yield of "defect free" parts is significantly higher when the log is nearer to the axis of rotation of the saw 600. FIG. 3B is a bar chart of the results from Table 1.

TABLE 1

| Billets | Parts passed | Parts failed | Top Face Crack Yield | Bottom Face Crack Yield |
|---|---|---|---|---|
| 0.050" blade | 0 | 20 | 60% | 75% |
| 0.040" blade | 4 | 17 | 86% | 86% |
| YL11-1 | 0 | 64 | 33% | 67% |
| YL11-2 | 12 | 53 | 61% | 81% |
| YL11-3 | 9 | 63 | 63% | 82% |
| YL11-4 | 5 | 73 | 42% | 50% |
| YL11-5 | 16 | 63 | 41% | 58% |
| YL11-6 | 5 | 83 | 19% | 27% |
| YL11-7 | 3 | 77 | 9% | 16% |
| Average | | | 38% | 55% |
| YL14-1 | 37 | 61 | 90% | 80% |
| YL14-2 | 28 | 69 | 85% | 63% |
| YL14-3 | 24 | 73 | 90% | 51% |
| YL14-4 | 36 | 61 | 93% | 84% |
| YL14-5 | 38 | 57 | 99% | 83% |
| YL14-6 | 72 | 44 | 97% | 93% |
| YL14-7 | 37 | 96 | 96% | 53% |
| Average | | | 93% | 72% |

Comparative Example

Figure 5:
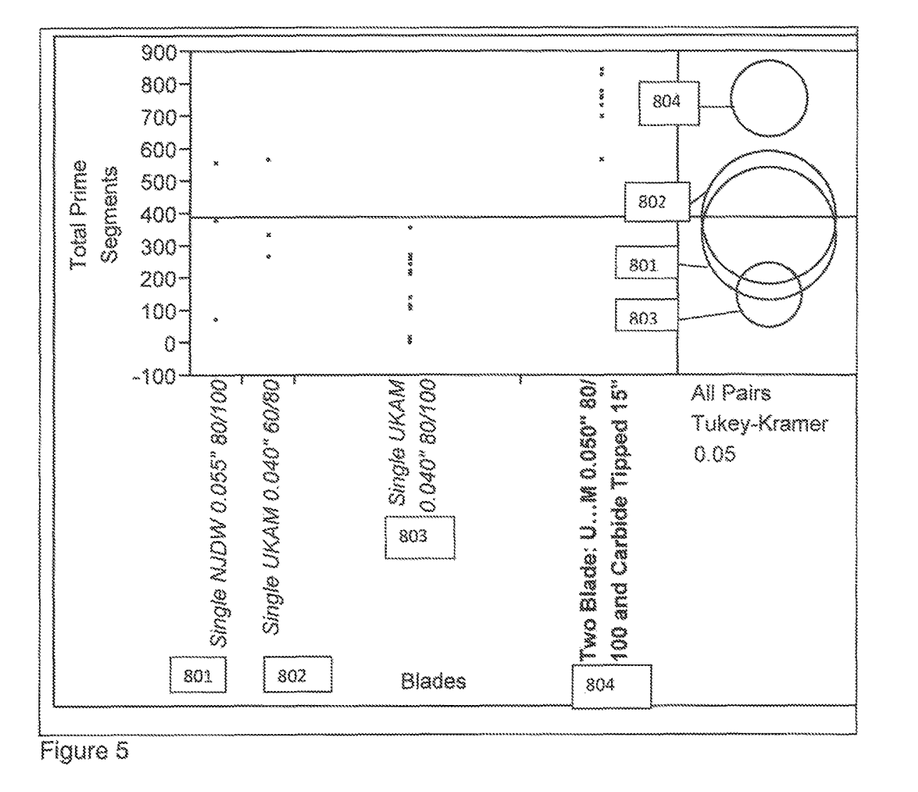
FIG. 5 is a chart showing the results of the Comparative Example.

Examples are run between a dual blade member 200 and three single blade configurations. In set-up number one, a single blade with a 0.055" core thickness and an 80/100 diamond grit is used, set-up number two, a single blade with a 0.040" core thickness and a 60/80 diamond grit is used, set-up number three, a single blade with a 0.040" core thickness and an 80/100 diamond grit is used, and in the fourth set-up, a dual blade as described in Example 1 is used). The various blade configurations are defined in Table 2 below The blades are rotated at a rate of about 1500 rpm and feed into the logs 300 at a rate ranging from about 10 to 40 cm/minute to perform the cutting of the log 300. At least 2000 logs 300 are cut in each set-up and the resulting percent of defect free logs is presented in FIG. 6. A defect being defined as at least two chips with a depth of at least 1 mm at or near (e.g. with about 25 mm) the exit edge of the cut. Using Tukey-Kramer method (Tukey-Kramer method is a single-step multiple comparison procedure and statistical test generally used in conjunction with an ANOVA to find which means are significantly different from one another) it is shown that the inventive dual blade approach produces a significantly larger percentage of acceptable ("prime") parts or segments. The results are shown in the chart of FIG. 5. The circles on the right of the chart show the range of results for each blade configuration.

TABLE 2

| Term | Description | Ref Noi. |
|---|---|---|
| Prime Part | A part that exhibits 2 or less chips each less than 1 mm deep. | |
| Single NJDW 0.055" 80/100 | North Jersey Diamond Wheel supplied blade with a 0.055" core thickness and an 80/100 diamond grit | 801 |
| Single UKAM 0.040" 60/80 | UKAM supplied blade with a 0.040" core thickness and a 60/80 diamond grit | 802 |
| Single UKAM 0.040" 80/100 | UKAM supplied blade with a 0.040" core thickness and an 80/100 diamond grit | 802 |
| Two Blade UKAM 0.050" 80/100 and Carbide Tipped 15" | Two blade set up. Primary blade: UKAM supplied blade with a 0.050" core thickness and an 80/100 diamond grit Secondary blade: Specialty Saw Inc. supplied carbide tipped blade 15" in diameter with ⅛" kerf (custom designed) | 803 |

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

Any numerical values recited in the above application include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps. Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

What is claimed is:

1. A ceramic log cutting apparatus, comprising:
   (i) a nesting fixture for holding a ceramic log;
   (ii) one or more cutting devices, the one or more cutting devices comprised of a motor and a dual bladed cutting member;
      wherein a first blade of the dual bladed cutting member provides a finished surface and an abutted and radially inwardly off-set second blade removes a percentage of scrap above the finished surface; and
      wherein the first blade is an abrasive saw and the abutted and radially inwardly off-set second blade is a serrated blade with carbide tips.

2. The ceramic log cutting apparatus according to claim 1, wherein the abutted and radially inwardly off-set second blade has a kerf that allows for a percentage of scrap to be removed that is sufficient to prevent one or more defects proximate to an exit edge of a cut in the ceramic log.

3. The ceramic log cutting apparatus according to claim 1 wherein the abutted and radially inwardly off-set second blade provides increased structural rigidity to the first blade.

4. The ceramic log cutting apparatus according to claim 1, wherein a leading edge of a cutting surface of the abutted and radially inwardly off-set second blade is at least 2 mm inside that of a leading edge of a cutting surface of the first blade.

5. The ceramic log cutting apparatus according to claim 2, wherein the kerf of the abutted and radially off-set inwardly second blade ranges between 4 mm to 30 mm.

6. The ceramic log cutting apparatus according to claim 1, wherein a leading edge of a cutting surface of the abutted and radially inwardly off-set second blade is off-set inside that of a leading edge of a cutting surface of the first blade a sufficient distance such that a sufficient amount of scrap is removed to prevent one or more defects proximate to an exit edge of a cut in the ceramic log.

7. The ceramic log cutting apparatus according to claim 1, wherein the serrated blade is a single sided set.

8. The ceramic log cutting apparatus according to claim 1, wherein the one or more cutting devices comprises a circular saw.

9. The ceramic log cutting apparatus according to claim 1, wherein the one or more cutting devices comprises a band saw.

10. The ceramic log cutting apparatus according to claim 1, wherein the one or more cutting devices comprises a reciprocating saw.

11. A method comprising:
providing a ceramic log with a first end and an opposing second end, wherein the ceramic log comprises one or more honeycomb structures encased by an outer skin layer;
providing one or more cutting devices according to claim 1; and,
removing material by cutting at least the first end with the dual bladed cutting member, wherein the first blade of the dual bladed cutting member provides the finished surface and the abutted and radially inwardly offset second blade removes the percentage of scrap above the finished surface.

12. The method according to claim 11, wherein the ceramic log has a moisture content below 10 percent by weight or less.

13. The method according to claim 11, further comprising the steps of removing material by cutting at least the opposing second end with the dual bladed cutting member.

14. The method according to claim 11, wherein the first end and the opposing second end are cut concurrently with two dual bladed cutting members.

15. The method according to claim 11, wherein a center axis of the ceramic log and an axis of rotation of the dual bladed cutting member are laterally off-set no more than ½ a radius of a larger blade of the first blade and the abutted and radially inwardly off-set second blade.

16. A ceramic log cutting apparatus, comprising:
(i) a nesting fixture to hold a ceramic log;
(ii) one or more cutting devices, the one or more cutting devices comprised of a motor and a dual bladed cutting member, wherein the dual bladed cutting member includes:
 a) a first blade which is an abrasive saw to provide a finished surface to the ceramic log;
 b) a second blade which is a serrated blade with carbide tips to remove a percentage of scrap above the finished surface; and
wherein the second blade abuts the first blade in one plane to provide the first blade with structural rigidity and is inwardly off-set from a leading edge of a cutting surface of the first blade along a leading edge of a cutting surface of the second blade.

17. The ceramic log cutting apparatus of claim 16, wherein the leading edge of the cutting surface of the second blade is at least 2 mm inside that of the leading edge of the cutting surface of the first blade.

18. The ceramic log cutting apparatus according to claim 17, wherein the second blade includes a kerf which ranges between 4 mm to 30 mm.

19. A method using one or more of the ceramic log cutting apparatuses of claim 16 comprising:
providing a ceramic log with a first end and an opposing second end, wherein the ceramic log comprises one or more honeycomb structures encased by an outer skin layer; and
removing material by cutting at least the first end with the dual bladed cutting member, wherein the first blade provides the finished surface and the second blade removes the percentage of scrap above the finished surface.

20. The method according to claim 19, wherein the ceramic log has a moisture content below 10 percent by weight or less.

* * * * *